(12) United States Patent
Kim

(10) Patent No.: US 7,197,393 B2
(45) Date of Patent: Mar. 27, 2007

(54) METHOD FOR CONVERTING COORDINATE VALUES OF MAP DATA

(75) Inventor: Young-In Kim, Jinhae-si (KR)

(73) Assignee: LG Electronics Inc., Seoul (KR)

( * ) Notice: Subject to any disclaimer, the term of this patent is extended or adjusted under 35 U.S.C. 154(b) by 243 days.

(21) Appl. No.: 11/039,616

(22) Filed: Jan. 19, 2005

(65) Prior Publication Data

US 2005/0159886 A1    Jul. 21, 2005

(30) Foreign Application Priority Data

Jan. 20, 2004  (KR) .................... 10-2004-0004479

(51) Int. Cl.
*G01C 21/30* (2006.01)
(52) U.S. Cl. ............... 701/208; 701/207; 701/209; 340/995.12; 340/995.14; 340/995.15
(58) Field of Classification Search ........ 701/200–213, 701/300, 220, 221; 340/990, 995.1–995.28
See application file for complete search history.

(56) References Cited

U.S. PATENT DOCUMENTS

| | | | | |
|---|---|---|---|---|
| 5,948,043 | A * | 9/1999 | Mathis | 701/208 |
| 6,445,999 | B1 * | 9/2002 | Nakamura | 701/208 |
| 6,895,329 | B1 * | 5/2005 | Wolfson | 701/209 |
| 6,968,271 | B1 * | 11/2005 | Wolfson | 701/209 |
| 7,016,781 | B1 * | 3/2006 | Wolfson | 701/209 |
| 7,027,916 | B2 * | 4/2006 | Furukawa | 701/201 |

* cited by examiner

*Primary Examiner*—Richard M. Camby
(74) *Attorney, Agent, or Firm*—Lee, Hong, Degerman, Kang & Schmadeka

(57) ABSTRACT

The present invention relates to a method for converting coordinate values of map data, wherein three-dimensional effects are displayed on a screen by converting two-dimensional coordinate values of objects constituting a map without using a three-dimensional graphic library and an additional storage space.

In the method of the present invention, two-dimensional map data for a certain area including a reference position are loaded from a map data storage unit and then moved with respect to the reference position and a sight line along which the two-dimensional map data are viewed from the reference position; an XY coordinate system with an origin of a central position of the moved two-dimensional map data is defined and coordinate values of objects constituting the two-dimensional map data are converted into coordinate values in the XY coordinate system; and Y-axis coordinate values obtained through the XY coordinate conversion of the two-dimensional map data are converted on a reduced scale at a reduction ratio predetermined according to the Y-axis coordinate values, and X-axis coordinate values of the objects in a digital map with the reduced Y-axis coordinate values are converted on an enlarged or reduced scale according to a predetermined X-axis coordinate value conversion function, thereby displaying the map on the screen while representing three-dimensional effects.

15 Claims, 5 Drawing Sheets

METHOD FOR CONVERTING COORDINATE VALUES OF MAP DATA

BACKGROUND OF THE INVENTION

1. Field of the Invention

The present invention relates to a method for converting coordinate values of map data, wherein three-dimensional effects are displayed on a screen by converting X- and Y-axis coordinate values of two-dimensional map data without using a three-dimensional graphic library and an additional storage space.

2. Description of the Related Art

A navigation system detects a current vehicle location using navigation messages transmitted by a plurality of GPS satellites constituting a global position system (GPS) and using detection signals from sensors installed on a vehicle, including a gyro sensor and a speed sensor, and matches the detected current vehicle location to map data so that the current vehicle location can be displayed on a screen. Further, the navigation system provides the functions of searching for a travel path with the shortest distance from the detected current vehicle location to a destination input by a user, a travel path with the shortest travel time based on traffic information, or the like, and guiding the travel of the vehicle along the searched travel path.

In the navigation system, a map around the current vehicle location and the destination should be displayed on the screen in order to display the current vehicle location together with a map on the screen after the matching of the detected current vehicle location to map data or to guide the travel of the vehicle while enabling a user to view the searched travel path of the vehicle from the current vehicle location to the destination.

Upon display of the map on the screen, two-dimensional map data stored in a memory are not displayed on the screen as they are, but converted into three-dimensional map data for a bird's eye view, which in turn are displayed on the screen. This can provide a user with more realistic information on the topography of surrounding regions.

To this end, in a conventional technique, as shown in FIG. 1b, Z-axis is added to two-dimensional map data with X- and Y-axis coordinates shown in FIG. 1a to define a three-dimensional virtual space, and two-dimensional coordinates P(x, y) of each of objects constituting the two-dimensional map data are converted into three-dimensional coordinates P(x, y, z) (the Z-axis coordinate value z is generally set to 0). Then, the entire map data with the converted three-dimensional coordinates are displayed in a state inclined in the same direction on the screen, and three-dimensional objects including buildings are displayed on the three-dimensional map that has been displayed on the screen.

However, since such a conventional technique requires the conversion of two-dimensional map data into three-dimensional map data using an additional three-dimensional graphic library that depends on hardware, the portability of high-level application in an embedded system is low and there is a need for an additional space for storing data to be operated.

Further, when a user views the three-dimensional map that is obtained simply by setting Z-axis coordinate values for respective objects of two-dimensional map data to be converted into three-dimensional map data and simultaneously displaying the three-dimensional map data in the state inclined in the same direction, the user may be more confused as compared with when he/she views a two-dimensional map. That is, in a three-dimensional map, a region close to a view point is displayed on an enlarged scale while a region far away from the view point is displayed on a reduced scale.

However, the conventional technique is to represent three-dimensional effects simply by setting Z-axis coordinate values for objects of two-dimensional map data and displaying the obtained three-dimensional map data in the inclined state. Therefore, since all regions close to and far away from the view point are displayed on the same scale, the user may be confused in correctly determining the position of a certain object displayed on the three-dimensional map.

Moreover, since the conventional technique has a great amount of calculation resulting in a low processing rate and requires an additional space for storing data to be operated, there is a problem in that the technique cannot be applied to mobile equipment such as a mobile communication terminal in which a central processing unit with limited calculation capability is mounted.

SUMMARY OF THE INVENTION

An object of the present invention is to provide a method for converting coordinate values of map data, wherein three-dimensional effects are displayed on a screen only by converting X- and Y-axis coordinate values of respective objects of two-dimensional map data without using an additional three-dimensional graphic library and an additional storage space.

Another object of the present invention is to provide a method for converting coordinate values of map data, wherein three-dimensional effects are represented even in mobile equipment mounted with a central processing unit with limited performance simply by converting X- and Y-axis coordinate values of two-dimensional map data.

According to an aspect of the present invention for achieving the objects, there is provided a method for converting coordinate values of map data, comprising a map data loading step of loading, by a control unit, two-dimensional map data from a map data storage unit; an XY coordinate converting step of defining an XY coordinate system with an origin of a central position of the two-dimensional map data loaded in the map data loading step, and converting coordinate values of objects constituting the two-dimensional map data into coordinate values in XY coordinate system; and a coordinate value converting step of converting Y-axis coordinate values of the objects obtained through the XY coordinate converting step on a reduced scale at a reduction ratio predetermined according to the Y-axis coordinate values, and converting X-axis coordinate values thereof by substituting them into a predetermined X-axis coordinate value conversion function.

According to another aspect of the present invention, there is provided a method for converting coordinate values of map data, comprising a map data loading step of loading, by a control unit, two-dimensional map data for an input area including a reference position from a map data storage unit; a map data moving step of shifting and rotating coordinate values of the two-dimensional map data loaded in the loading step with respect to the reference position and a sight line along which the two-dimensional map data are viewed from the reference position; an XY coordinate converting step of defining an XY coordinate system with an origin of a central position of the two-dimensional map data moved in the map data moving step, and converting coordinate values of objects constituting the two-dimensional map data into coordinate values in the XY coordinate system; and a coordinate value converting step of converting Y-axis coordinate values of the objects obtained through the XY coordinate converting step on a reduced scale at a reduction ratio predetermined according to the Y-axis coordinate values, and converting X-axis coordinate values thereof by substituting them into a predetermined X-axis coordinate value conversion function.

The reference position in the loading step and the moving step may be a current vehicle location detected from a navigation message received by a GPS receiver or from detection signals of a sensor unit installed on a vehicle, or may be a position input by a user through a command input unit. The sight line in the moving step may be a direction in which a vehicle travels from the reference position.

The conversion of the Y-axis coordinate values in the coordinate value converting step may comprise the steps of dividing the map data into a region of Y>0 and a region of Y≦0 along a Y-axis, setting reduction ratios for the divided regions such that a higher reduction ratio is applied to the region of Y>0 than the region of Y≦0, and converting the Y-axis coordinate values of the plurality of objects on the reduced scale at the set reduction ratios.

The conversion of the Y-axis coordinate values in the coordinate value converting step may comprise the steps of dividing the map data into a plurality of uniform regions along a Y-axis, setting reduction ratios for the divided regions such that higher reduction ratios are applied to regions with higher Y-axis coordinate values, and converting the Y-axis coordinate values of the plurality of objects in the respective regions on the reduced scale at the set reduction ratios.

The conversion of the Y-axis coordinate values in the coordinate value converting step may comprise the steps of dividing the map data into a plurality of regions along a Y-axis such that regions with higher Y-axis coordinate values become smaller, setting reduction ratios for the divided regions such that higher reduction ratios are applied to regions with higher Y-axis coordinate values, and converting the Y-axis coordinate values of the plurality of objects on the reduced scale at the set reduction ratios.

After the coordinate value converting step, the method may further comprise the step of outputting the map data with the converted X-axis and Y-axis coordinate values to a display driving unit so that the map data can be displayed on a screen.

BRIEF DESCRIPTION OF THE DRAWINGS

The above and other objects, features and advantages of the present invention will become apparent from the following description of a preferred embodiment given in conjunction with the accompanying drawings, in which.

DETAILED DESCRIPTION OF THE INVENTION

Hereinafter, a method for converting coordinate values of map data according to the present invention will be described in detail with reference to the accompanying drawings, especially FIGS. 2 to 7.

Figure 1A:
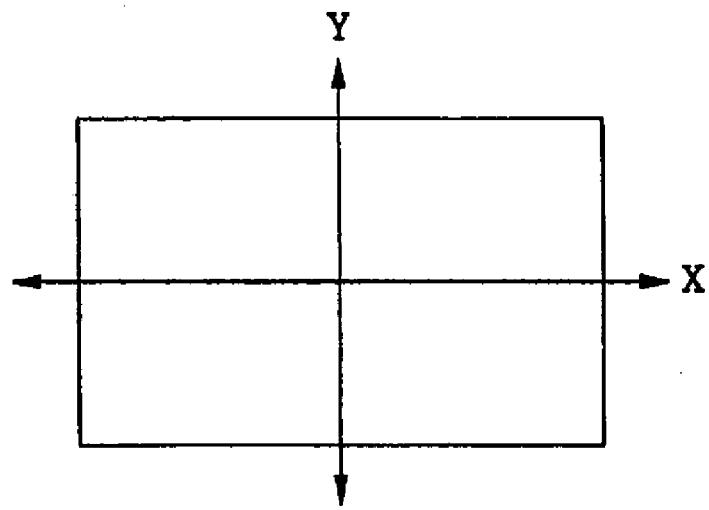
FIGS. 1a and 1b are views illustrating a conventional method for converting coordinate values.
Figure 1B:
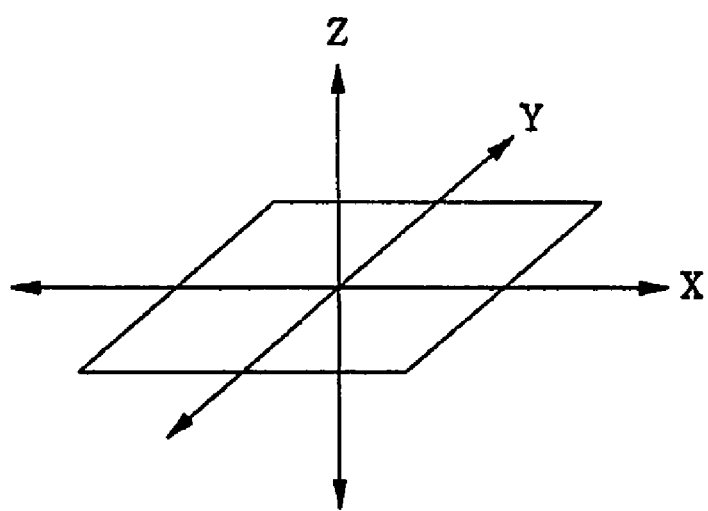
Figure 2:
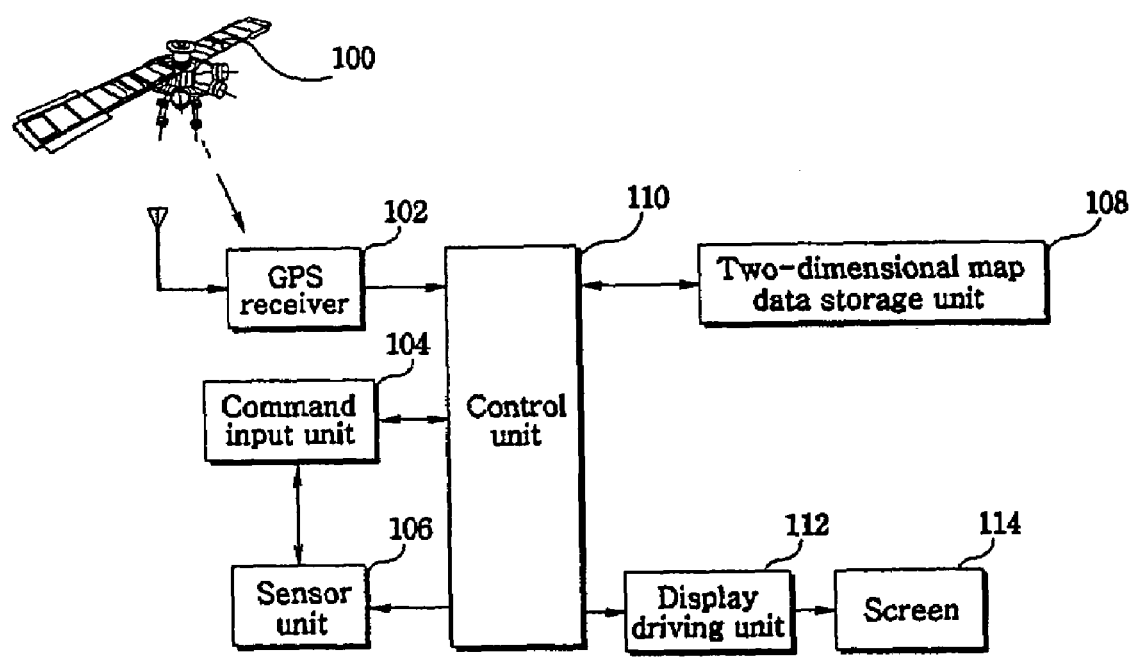
FIG. 2 is a block diagram exemplarily showing a configuration of a navigation system to which a method for converting coordinate values according to the present invention is applied.

FIG. 2 is a block diagram exemplarily showing a configuration of a navigation system to which the method for converting coordinate values of map data according to the present invention is applied. As shown in the figure, the navigation system comprises a GPS receiver 102 for receiving a navigation message transmitted by a GPS satellite 100; a command input unit 104 for inputting operation commands according to user's manipulation; a sensor unit 106 including a gyroscope and a speed sensor installed on a vehicle to detect the angular displacement amount of travel of the vehicle and a travel speed thereof; a two-dimensional map data storage unit 108 for beforehand storing two-dimensional map data; a control unit 110 capable of controlling operations for determining a current vehicle location based on the navigation message received by the GPS receiver 102 and a detection signal from the sensor unit 106, for reading two-dimensional map data for a certain area stored in the two-dimensional map data storage unit 108 based on the determined current vehicle location, for converting coordinate values of the read two-dimensional map data to represent three-dimensional effects, matching the detected current vehicle location to the converted coordinate values, and for displaying the map data with the converted coordinate values and the current vehicle location; and a display driving unit 112 for causing the map data with the converted coordinate values and the current vehicle location to be displayed on a screen 114 under the control of the control unit 110.

The GPS receiver 102 of the navigation system constructed as above receives the navigation message transmitted by the GPS satellite 100 and inputs it into the control unit 110. The sensor unit 106 generates pulse signals in proportion to the angular displacement amount of travel and a travel distance of the vehicle according to the travel of the vehicle and inputs the signals into the control unit 110.

Then, the control unit 102 determines the angular displacement amount of travel and the travel distance of the vehicle using the signals output from the sensor unit 106, and also determines the current vehicle location using the determined angular displacement amount of travel and travel distance of the vehicle as well as the navigation message received by the GPS receiver 102.

The control unit 110 reads two-dimensional map data for a certain area from two-dimensional map data stored in the two-dimensional map data storage unit 108 based on the determined current vehicle location, and shifts and/or rotates coordinates of objects constituting the read two-dimensional map data according to the current vehicle location and a travel direction of the vehicle. Then, to represent three-dimensional effects according to the present invention, the control unit 110 converts X- and Y-axis coordinate values of the objects, matches the current vehicle location to the map data, and outputs the matched current vehicle location together with the map data to the display driving unit 112 so that they can be displayed on the screen 114.

Figure 3:
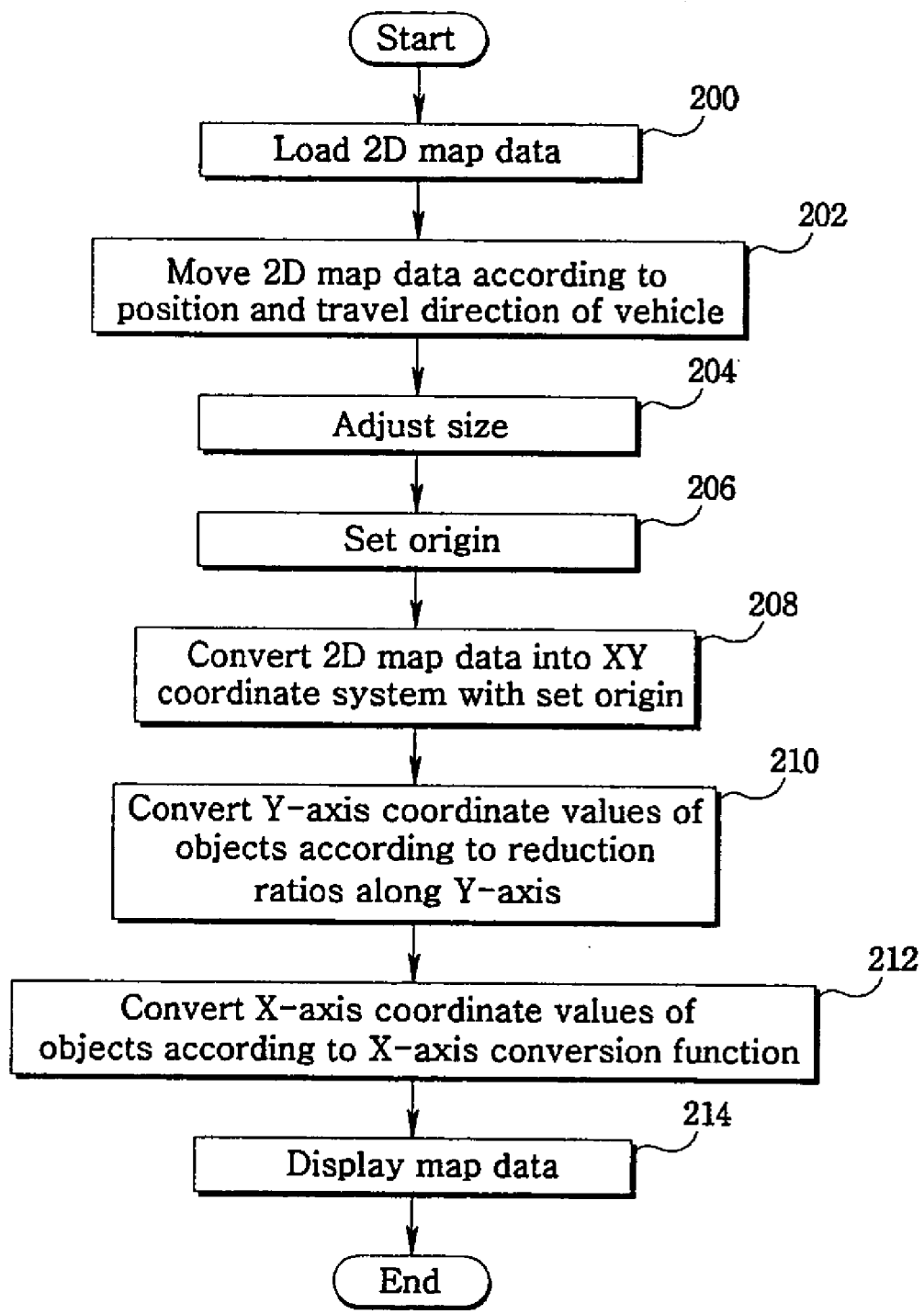
FIG. 3 is a flowchart illustrating the method for converting coordinate values according to the present invention.
Figure 4:
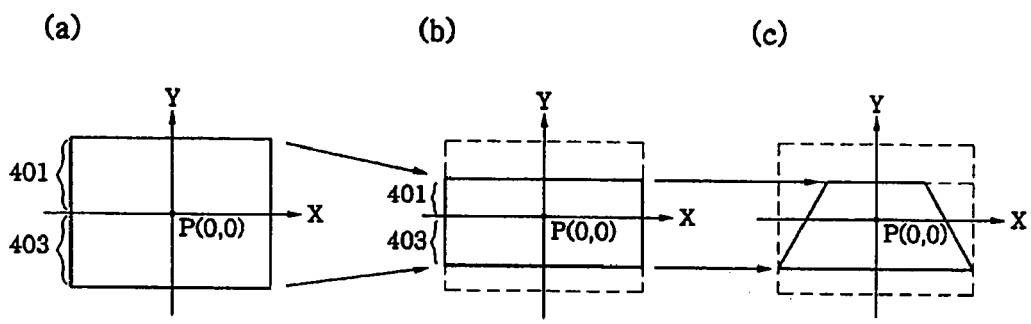
FIGS. 4 to 6 are views illustrating operations for converting X- and Y-axis coordinate values of two-dimensional map data by means of the method for converting coordinate values according to the present invention.
Figure 5:
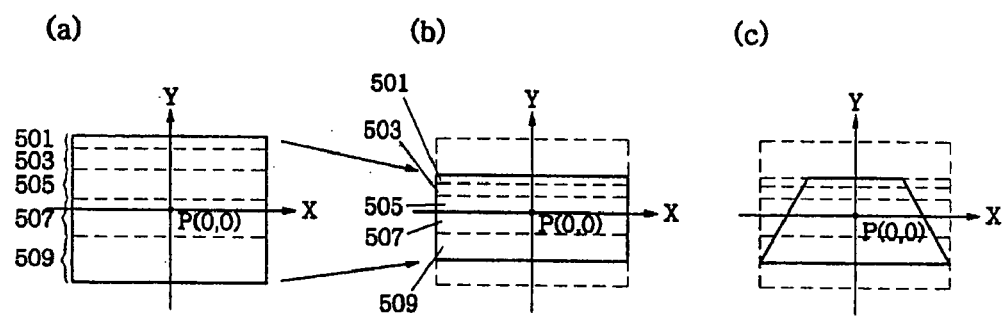
Figure 6:
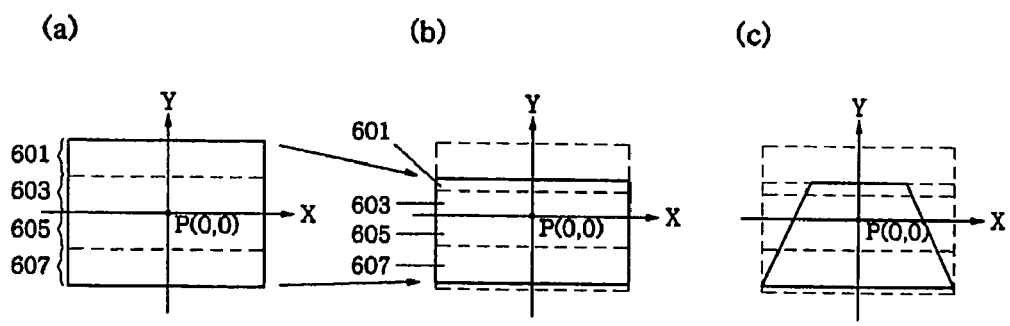

FIG. 3 is a flowchart illustrating the method for converting coordinate values according to the present invention by which the aforementioned navigation system reads the two-dimensional map data stored in the two-dimensional map data storage unit 108, converts the X- and Y-axis coordinate values of the objects and causes them to be displayed on the screen 114 so as to represent the three-dimensional effects. A shown in the figure, the control unit 110 reads the two-dimensional map data stored in the two-dimensional map data storage unit 108 (step 200). Upon reading the two-dimensional map data, the current vehicle location determined based on the navigation message received by the GPS receiver 102 and the signals output from the sensor unit 106 or a certain location input by a user through the command input unit 104 is set as a reference position, and two-dimensional map data for a certain area including the set reference position are read.

The control unit 110 shifts the read two-dimensional map data so that the vehicle location can be positioned at the center of the two-dimensional map data, and rotates the two-dimensional map data using the travel direction of the vehicle as a sight line (step 202).

Then, the size of the shifted two-dimensional map data is adjusted to a size suitable for displaying them on the screen 114 (step 204). Here, the size of the two-dimensional map data may be adjusted according to an enlargement or reduction ratio set by the user.

As shown in FIGS. 4a, 5a and 6a, the control unit 110 then defines an XY coordinate system with an origin of P(0, 0) at the center of the two-dimensional map data (step 206). The coordinate values of the respective objects constituting the two-dimensional map data are converted into X- and Y-axis coordinate values based on the origin of P(0, 0) (step 208).

The Y-axis coordinate values of the objects constituting the two-dimensional map data are converted on a reduced scale at a reduction ratio predetermined according to the Y-axis coordinate values (step 210). The X-axis coordinate values of the objects are converted on an enlarged or reduced scale according to a predetermined conversion function (step 212).

The map data of which the X- and Y-axis coordinate values of the objects have been converted are trimmed to be suitable for the size of the screen 114 and then output to the display driving unit 112 so that a map with three-dimensional effects can be displayed on the screen 114 (step 214).

That is, in the case where two-dimensional map data are displayed as a map with three-dimensional effects on the screen, a region close to the view point should be displayed on an enlarged scale and a region far away from the view point should be displayed on a reduced scale.

Therefore, according to the present invention, a low reduction ratio is set for a region close to the view point, i.e. objects with small Y-axis coordinate values of two-dimensional map data, whereas a high reduction ratio is set for objects with large Y-axis coordinate values. Based on the set reduction ratios, the Y-axis coordinate values of the objects constituting the two-dimensional map data are converted on a reduced scale.

Here, the reduction of the Y-axis coordinate values can be performed by means of a variety of methods.

For example, as for two-dimensional map data shown in FIG. 4a, region 401 with a Y-axis coordinate value satisfying 'Y>0' is reduced to a size that is ½ times as large as its original size, and region 403 with a Y-axis coordinate value satisfying 'Y≦0' is reduced to a size that is ⅔ times as large as its original size, as shown in FIG. 4b.

As for two-dimensional map data shown in FIG. 5a, partition is made to obtain a plurality of partitioned regions 501, 503, 505, 507 and 509 with Y-axis coordinate values that are sequentially reduced as Y-axis coordinate values of the map data increase. As the Y-axis coordinate values of the map data increase, sequentially higher reduction ratios are set for the plurality of regions 501, 503, 505, 507 and 509, so that the Y-axis coordinate values can be reduced as shown in FIG. 5b. That is, region 501, region 503, region 505, region 507 and region 509 are reduced to sizes that are ½ times, ⅔ times, ¾ times, ⅘ times and ⅚ times as large as their original sizes, respectively.

Further, according to the present invention, a plurality of regions 601, 603, 605 and 607 are uniformly partitioned along the Y-axis, as shown in FIG. 6a. As the Y-axis coordinate values of the map data increase, sequentially higher reduction ratios are set for the plurality of partitioned regions 601, 603, 605 and 607, so that the Y-axis coordinate values can be reduced as shown in FIG. 6b. That is, region 601, region 603, region 605 and region 607 are reduced to sizes that are ½ times, ⅔ times, ¾ times and ⅘ times as large as their original sizes, respectively.

When the Y-axis coordinate values of the objects constituting the two-dimensional map data have been completely converted on the reduced scale, upper regions with higher Y-axis coordinate values among the two-dimensional map data should be reduced along the X-axis, while lower regions with lower Y-axis coordinate values should be enlarged along the X-axis, so that a region close to the view point can be displayed on an enlarged scale and a region far away from the view point can be displayed on a reduced scale even along the X-axis. In the present invention, an X-axis coordinate conversion function for use in converting X-axis coordinate values of the two-dimensional map data is set in advance. The X-axis coordinate values of the respective objects constituting the two-dimensional map data are converted according to the set X-axis coordinate conversion function (step 212).

Next, the process of converting the X-axis coordinate values of the objects will be described in greater detail.

Figure 7:
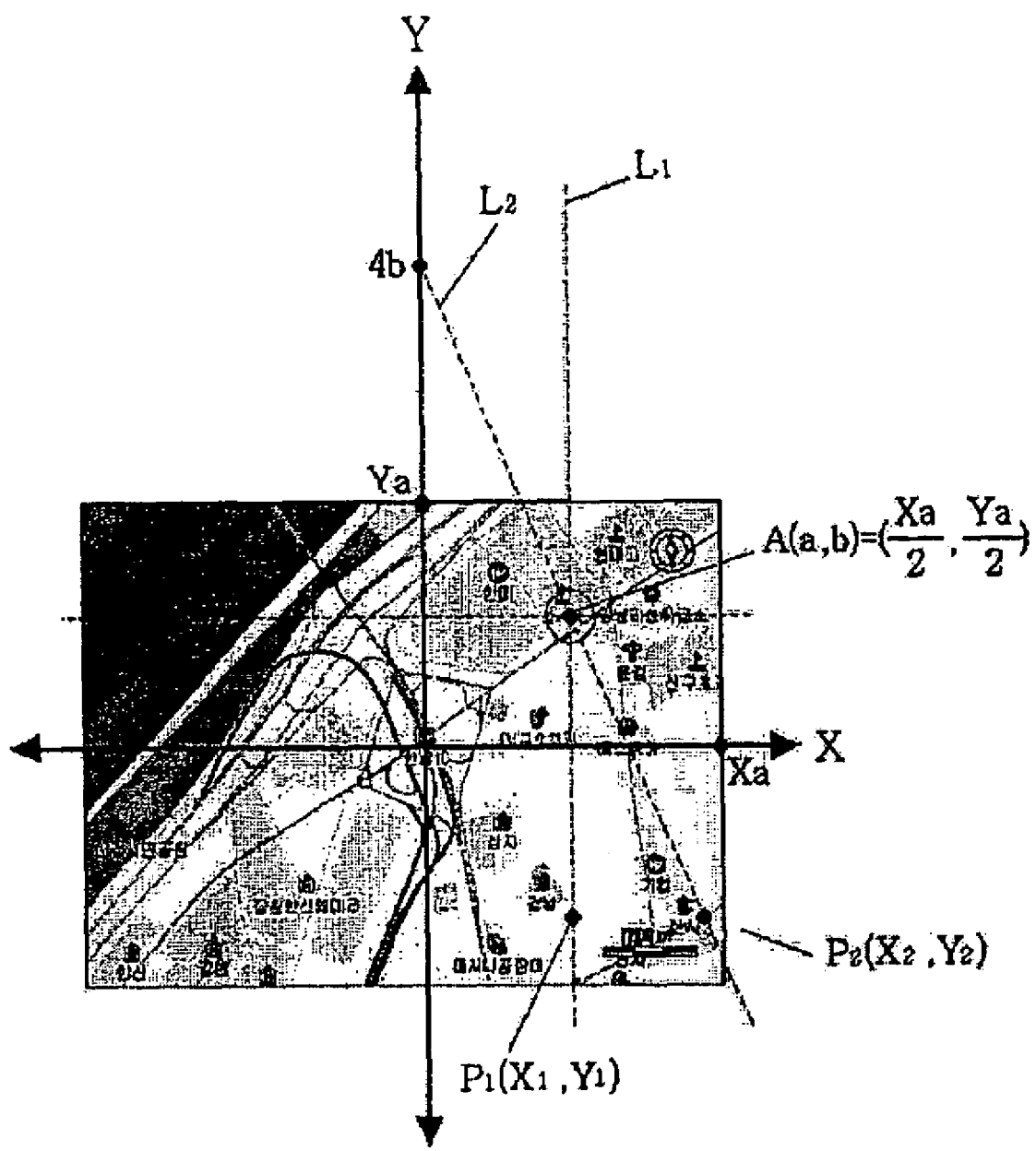
FIG. 7 is a view illustrating the process of deriving a conversion function for converting an X-axis coordinate value in the method for converting coordinate values according to the present invention.

As shown in FIG. 7, coordinates of a reference point A(a, b)=(Xa/2, Ya/2) for use in converting the X-axis coordinate values of the respective objects constituting the two-dimensional map data on an enlarged or reduced scale at predetermined ratios according to the Y-axis coordinate values is first set.

Assume that a line which intersects the coordinates of the reference point A(a, b) and is parallel to the Y-axis is $L_1$ and a line which intersects the coordinates of the reference point A(a, b) and has a predetermined gradient is $L_2$.

When a conversion function for use in converting line $L_1$ into $L_2$ is applied to respective X-axis coordinate values of all objects existing on an XY plane, the map data in the form of rectangles shown in FIGS. 4b, 5b and 6b can be converted into map data in the form of bilaterally symmetric trapezoids shown in FIGS. 4c, 5c and 6c.

In the present invention, an X-axis coordinate conversion function B(x, y) for use in converting the X-axis coordinate values of the objects is defined as the following equation 1:

$$B(x, y) = \left( \frac{4b - y}{3b}, y \right) \quad (1)$$

wherein b is the Y-axis coordinate value of reference point A.

Now, the process of deriving the conversion function B(x, y) will be described.

Line $L_2$ of FIG. 7 that has a predetermined gradient and intersects the coordinates of the reference point A(a, b) can be expressed as the following equation 2:

$$Y_2 = mX_2 + n \quad (2)$$

wherein on the assumption that the Y-axis coordinate value of an intersection between the Y-axis and line $L_2$ is 4b, gradient m is $-3b/a$ and Y-axis intercept n is 4b.

When the coordinate values of an arbitrary point on an XY plane are converted so that three-dimensional effects can be represented in the same manner as conversion of the coordinate values of arbitrary point $P_1(X_1, Y_1)$ existing on line $L_1$ into the coordinate values of point $P_2(X_2, Y_2)$ existing on line $L_2$, the converted coordinate values are expressed as the following equation 3:

$$X_2 = \frac{1}{m}(Y_2 - n) \qquad (3)$$
$$Y_2 = Y_1$$

Since the Y-axis coordinate value is not changed in equation 3, only the change in the X-axis coordinate value is applied.

Therefore, upon application thereof to a proportional expression such as the following equation 4, a change ratio of an X-axis coordinate value can be obtained.

$$X_1 : X_2 = x_1 : x_2 \Rightarrow x_2 = \frac{X_2}{X_1} \cdot x_1 \qquad (4)$$

wherein since $X_1 = a$, $X_2 = 1/m(Y_2-n)$, $Y_2 = y$, $m=(-3b/a)$ and $n=4b$, equation 4 becomes the following equation 5:

$$x_2 = \frac{1}{a} \times \frac{a}{3b} \times (y - 4b) \times x_1 = \frac{4b - y}{3b} \times x_1 \qquad (5)$$

Therefore, conversion function $B(x, y) = ((4b-y)/3b, y)$ is obtained. When conversion function $B(x, y)$ is applied to the X-axis coordinate values of the respective objects constituting the map data, the map data in the form of rectangles shown in FIGS. 4b, 5b and 6b are converted into the map data in the form of bilaterally symmetric trapezoids shown in FIGS. 4c, 5c and 6c.

As described above, the present invention is to convert coordinate values of two-dimensional map data so as to represent three-dimensional effects through simple conversion without using an additional graphic library or additional storage space. Accordingly, the present invention can be simply applied even to mobile equipment or the like mounted with a central processing unit with limited capability, so that two-dimensional map data can be simply converted and displayed to represent three-dimensional effects.

Meanwhile, although the present invention has been illustrated and described in connection with the preferred embodiment, it will be readily understood by those skilled in the art that various adaptations and changes can be made thereto without departing from the spirit and scope of the present invention defined by the appended claims. For example, although the present invention has been described by way of example as converting Y-axis coordinate values of objects on a reduced scale and subsequently converting X-axis coordinate values thereof on an enlarged or reduced scale according to an X-axis coordinate value conversion function, it is not limited thereto. The present invention may be implemented in various methods, including a method in which X-axis coordinate values of objects are first converted on an enlarged or reduced scale according to an X-axis coordinate value conversion function and Y-axis coordinate values thereof are then converted on a reduced scale.

What is claimed is:

1. A method for converting coordinate values of map data, comprising:
   a map data loading step of loading, by a control unit, two-dimensional map data from a map data storage unit;
   an XY coordinate converting step of defining an XY coordinate system with an origin of a central position of the two-dimensional map data loaded in the map data loading step, and converting coordinate values of objects constituting the two-dimensional map data into coordinate values in XY coordinate system; and
   a coordinate value converting step of converting Y-axis coordinate values of the objects obtained through the XY coordinate converting step on a reduced scale at a reduction ratio predetermined according to the Y-axis coordinate values, and converting X-axis coordinate values thereof by substituting them into a predetermined X-axis coordinate value conversion function.

2. The method as claimed in claim 1, wherein the conversion of the Y-axis coordinate values in the coordinate value converting step comprises the steps of:
   dividing the map data into a region of Y>0 and a region of Y≦0 along a Y-axis,
   setting reduction ratios for the divided regions such that a higher reduction ratio is applied to the region of Y>0 than the region of Y≦0, and
   converting the Y-axis coordinate values of the plurality of objects on the reduced scale at the set reduction ratios.

3. The method as claimed in claim 1, wherein the conversion of the Y-axis coordinate values in the coordinate value converting step comprises the steps of:
   dividing the map data into a plurality of uniform regions along a Y-axis,
   setting reduction ratios for the divided regions such that higher reduction ratios are applied to regions with higher Y-axis coordinate values, and
   converting the Y-axis coordinate values of the plurality of objects in the respective regions on the reduced scale at the set reduction ratios.

4. The method as claimed in claim 1, wherein the conversion of the Y-axis coordinate values in the coordinate value converting step comprises the steps of:
   dividing the map data into a plurality of regions along a Y-axis such that regions with higher Y-axis coordinate values become smaller,
   setting reduction ratios for the divided regions such that higher reduction ratios are applied to regions with higher Y-axis coordinate values, and
   converting the Y-axis coordinate values of the plurality of objects on the reduced scale at the set reduction ratios.

5. The method as claimed in claim 1, wherein the X-axis coordinate value conversion function in the coordinate value converting step is the following equation 1:

$$B(x, y) = \left( \frac{4b - y}{3b}, y \right) \qquad (1)$$

wherein B(x, y) is the X-axis coordinate value conversion function and b is a Y-axis coordinate value of a reference point for generating the X-axis coordinate value conversion function.

6. The method as claimed in claim 1, after the coordinate value converting step, further comprising the step of outputting the map data with the converted X-axis and Y-axis coordinate values to a display driving unit so that the map data can be displayed on a screen.

7. A method for converting coordinate values of map data, comprising:
- a map data loading step of loading, by a control unit, two-dimensional map data for an input area including a reference position from a map data storage unit;
- a map data moving step of shifting and rotating coordinate values of the two-dimensional map data loaded in the loading step with respect to the reference position and a sight line along which the two-dimensional map data are viewed from the reference position;
- an XY coordinate converting step of defining an XY coordinate system with an origin of a central position of the two-dimensional map data moved in the map data moving step, and converting coordinate values of objects constituting the two-dimensional map data into coordinate values in the XY coordinate system; and
- a coordinate value converting step of converting Y-axis coordinate values of the objects obtained through the XY coordinate converting step on a reduced scale at a reduction ratio predetermined according to the Y-axis coordinate values, and converting X-axis coordinate values thereof by substituting them into a predetermined X-axis coordinate value conversion function.

8. The method as claimed in claim 7, wherein the reference position in the loading step and the moving step is a current vehicle location detected from a navigation message received by a GPS receiver or from detection signals of a sensor unit installed on a vehicle.

9. The method as claimed in claim 7, wherein the reference position in the loading step and the moving step is a position input by a user through a command input unit.

10. The method as claimed in claim 7, wherein the sight line in the moving step is a direction in which a vehicle travels from the reference position.

11. The method as claimed in claim 7, wherein the conversion of the Y-axis coordinate values in the coordinate value converting step comprises the steps of:
- dividing the map data into a region of Y>0 and a region of Y≦0 along a Y-axis,
- setting reduction ratios for the divided regions such that a higher reduction ratio is applied to the region of Y>0 than the region of Y≦0, and
- converting the Y-axis coordinate values of the plurality of objects on the reduced scale at the set reduction ratios.

12. The method as claimed in claim 7, wherein the conversion of the Y-axis coordinate values in the coordinate value converting step comprises the steps of:
- dividing the map data into a plurality of uniform regions along a Y-axis,
- setting reduction ratios for the divided regions such that higher reduction ratios are applied to regions with higher Y-axis coordinate values, and
- converting the Y-axis coordinate values of the plurality of objects in the respective regions on the reduced scale at the set reduction ratios.

13. The method as claimed in claim 7, wherein the conversion of the Y-axis coordinate values in the coordinate value converting step comprises the steps of:
- dividing the map data into a plurality of regions along a Y-axis such that regions with higher Y-axis coordinate values become smaller,
- setting reduction ratios for the divided regions such that higher reduction ratios are applied to regions with higher Y-axis coordinate values, and
- converting the Y-axis coordinate values of the plurality of objects on the reduced scale at the set reduction ratios.

14. The method as claimed in claim 7, wherein the X-axis coordinate value conversion function in the coordinate value converting step is the following equation 1:

$$B(x, y) = \left( \frac{4b - y}{3b}, y \right) \quad (1)$$

wherein B(x, y) is the X-axis coordinate value conversion function and b is a Y-axis coordinate value of a reference point for generating the conversion function.

15. The method as claimed in claim 7, after the coordinate value converting step, further comprising the step of outputting the map data with the converted X-axis and Y-axis coordinate values to a display driving unit so that the map data can be displayed on a screen.

* * * * *